3,320,304
MONOESTERS OF BISPHENOLS AND PROCESS
Henry E. Hennis and Leonard R. Thompson, Midland, Mich., assignors to The Dow Chemical Company, Midland, Mich., a corporation of Delaware
No Drawing. Filed July 3, 1963, Ser. No. 292,770
6 Claims. (Cl. 260—479)

This invention relates to a new chemical process and to new compounds thereby made available. More specifically, it relates to a process for making bisphenol monoesters of lower alkanoic acids and to the new monoester products thereof. These monoesters have the structural formula

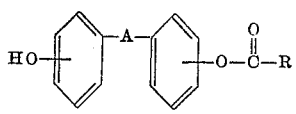

wherein A is a divalent alkylidene radical and R is a lower alkyl radical.

The esters thereby represented are the lower alkanoates of bisphenols such as methylenediphenol, isopropylidenediphenol, butylidenediphenol, benzylidenediphenol, cyclohexylidenediphenol, and similar bisphenols obtained by reacting phenol with various aldehydes and ketones according to known procedures.

Although the preparation of the corresponding diesters of bisphenols and other symmetrical dihydroxy compounds usually offers no great difficulty, the monoesters of symmetrical dihydroxy compounds in general are not easily obtained and in many cases they must be made by indirect or specialized methods. Esterification of an alkylidenediphenol by conventional methods yields only the diester, since the two phenolic hydroxyl groups are identical and react simultaneously. It would be expected that hydrolysis of such diesters would proceed in a similar manner and that there would be no intermediate formation of a monoester other than the possible transitory existence of such a compound during the process. In most such reactions, this seems to be true.

However, it has now been found that by carefully controlled alcoholysis of diesters of alkylidenediphenols, substantial yields of hitherto unknown monoesters can be obtained. In particular, the monoacetate, monopropionate, and monobutyrate of p,p'-isopropylidenediphenol are thereby easily obtained as pure compounds.

The selective alcoholysis is accomplished by contacting one mole of the bisphenol diester with about one mole of a lower alkanol, preferably in inert solvent solution, and in the presence of a catalytic amount of an alkali metal alkoxide. The reaction mixture is maintained in substantially anhydrous condition throughout both the reaction and the separation of the product to prevent hydrolysis of the monoester.

The ratio of diester and lower alkanol is preferably the theoretical proportion of mole for mole in order to obtain the optimum yield of monoester. Somewhat more or less alkanol may be employed, usually with correspondingly reduced yields. By lower alkanol is meant an unsubstituted primary alkanol of one to about three carbon atoms. Methanol is preferred. Similarly, the alkoxide is the alkali metal salt of one of the alcohols specified. Lithium, sodium, or potassium salts are equivalent in the process. About 0.1–10% by weight of alkoxide based on the alkanol is effective.

By inert solvent is meant any organic solvent which is unreactive with the process reagents under the conditions specified. Preferably, the solvent is one having a boiling point of about 50–150° C. to facilitate its removal by distillation. Additionally the solvent should be one in which the reactants are at least moderately soluble. Suitable solvents are aromatic hydrocarbons and aromatic ethers with properties as listed, for example, toluene, xylene, and anisole.

The temperature is not a critical reaction condition for some hydrolysis will occur at any temperature. However, a temperature in the range of 0°–200° C. is generally most convenient.

The reaction is best conducted at about 50–150° C. At this temperature and under the other preferred conditions listed, the reaction is essentially completed in 1–10 hours.

Separation of the monester product from the reaction mixture can be done by any of several known techniques. A convenient and effective method comprises the removal of alkali metal salts by neutralization and precipitation with a weak anhydrous acid such as carbon dioxide or boric acid, distillation under reduced pressure to remove solvent and other similarly volatile materials, and vacuum distillation or chromatographic separation of the monoester from the distillation residue.

The example below illustrates operation of the process within the preferred limits as outlined.

Example 1

A solution of 75 g. of p,p'-isopropylidenediphenol diacetate in 150 ml. of dry toluene was heated to reflux temperature in a reaction flask equipped with a stirrer, a reflux condenser, and a dropping funnel. To the refluxing solution there was added dropwise a solution of 0.45 g. of sodium methoxide in 7.7 g. of methanol over a period of 20 minutes. The reaction mixture was stirred for an additional 1.5 hours at the reflux temperature, then it was cooled to room temperature and the sodium salts present were neutralized by bubbling through excess carbon dioxide. Precipitated sodium carbonate was removed by filtration and solvent was separated by distillation at 25 mm. Hg absolute to a pot temperature of 85° C. The viscous residue thereby obtained was dissolved in 45 ml. of carbon tetrachloride and this solution was chromatographed over finely divided activated alumina. The components of the solution were eluted with methylene chloride, a small amount of the diacetate being the first compound eluted and the monoacetate followed. The bisphenol present remained in the alumina. The monoacetate was recrystallized from a mixture of 45 ml. of perchloroethylene and 25 ml. of petroleum ether, thereby yielding 16.4 g. of white, crystalline product, M.P. 100–102° C. Elemental analysis showed 75.39% carbon, 6.57% hydrogen. Calculated for the bisphenol monoacetate, 75.53% carbon and 6.71% hydrogen.

By the procedure shown above, other bisphenol diesters are converted to the corresponding monoesters. In this way, p,p'-isopropylidenediphenol dipropionate is converted to the monoproprionate, methylenediphenol monoacetate is obtained from the diacetate, propylidenediphenol diacetate is reacted to form propylidenediphenol monoacetate, and compounds such as benzylidenediphenol monobutyrate, cyclohexylidenediphenol monoacetate, and sec-butylidenediphenol monopropionate are similarly obtained.

Other alkali metal alkoxides such as potassium methoxide, sodium isopropoxide, and lithium ethoxide are equivalent in the process to the sodium methoxide used in Example 1. Similarly, anhydrous ethyl alcohol or propyl alcohol can be used in place of methyl alcohol under the same reaction conditions.

The bisphenol monoesters obtained through this process are useful as inhibitors of fungal and bacterial growth in various media. They are particularly useful as chemical intermediates for use in making unsymmetrically halogenated bisphenols readily available as pure compounds. Few unsymmetrically brominated or chlorinated bisphenols are known and these have heretofore been obtainable only by specialized and indirect methods of synthesis. Example 2 illustrates the preparation of such compounds from the monoesters of this invention.

*Example 2*

A solution of 4.0 g. of p,p'-isopropylidene-diphenol monoacetate in 30 ml. of chloroform was cooled to 10° C. and a solution of 4.76 g. of bromine in 20 ml. of chloroform was added dropwise with good agitation After the addition was complete, the chloroform solvent was removed from the reaction mixture by evaporation and the oily residue was dissolved in 40 g. of 5% aqueous sodium hydroxide. Gentle warming was required to obtain complete solution which indicated completion of the ester hydrolysis. The solution was combined with 100 ml. of carbon tetrachloride and the mixture was acidified to pH 6 by the addition of 5% hydrochloric acid. The organic and aqueous layers were separated and the organic layer was washed with water and then diluted with 50 ml. of petroleum ether. The white crystals which separated from the cold solution were collected and dried to obtain 4.0 g. of 2,6-dibromo-4,4'-isopropylidendiphenol, M.P. 134–135° C.

By the use of half the quantity of bromine shown above, the monobrominated bisphenol is obtained. Similarly, the monochlorinated and unsymmetrically dichlorinated bisphenols are prepared. Monohalogenated and unsymmetrically halogenated bisphenols are obtained by the same procedure when other alkylidenebisphenols are employed as starting materials.

These unsymmetrically halogenated bisphenols are useful as inhibitors of bacterial and fungal growth. They are also useful as monomers for making fire-resistant polyester resins and as additives for plastics to improve and modify their fire-resistant properties.

These halogenated compounds and their preparation are the subject of our copending application, Ser. No. 292,752, concurrently filed herewith, now U.S. Patent No. 3,231,603.

We claim:
1. A compound of the formula

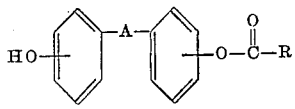

wherein A is selected from the group consisting of alkylidene of 1–4 carbon atoms, benzylidene, and cyclohexylidene and R is alkyl of 1–3 carbon atoms.

2. The compound of claim 1 wherein A is an isopropylidene radical.

3. p,p'-Isopropylidenediphenol monoacetate.

4. A process for making the monoester of an alkylidenebisphenol with an alkanoic acid of 1–4 carbon atoms which comprises reacting by contacting one mole of the corresponding bisphenol diester with about one mole of primary alkanol of 1–3 carbon atoms in the presence of a small but effective amount of an alkali metal lower alkoxide.

5. The process of claim 4 wherein the reaction is carried out in the presence of a solvent unreactive in the process.

6. A process for making p,p'-isopropylidenediphenol monoacetate which comprises reacting by contacting one mole of p,p'-isopropylidenediphenol diacetate in inert solvent solution with about one mole of primary alkanol of 1–3 carbon atoms in the presence of a small but effective amount of an alkali metal lower alkoxide at a temperature of about 0–200° C.

References Cited by the Examiner

UNITED STATES PATENTS 2,822,378  2/1958  Bader _____ 260—479

FOREIGN PATENTS 855,242  11/1960  Great Britain.

OTHER REFERENCES

Szeky: Chemisehes Central-Blatt (1904), Book II, p. 1737.

Wagner and Zook: Synthetic Organic Chemistry, John Wiley and Sons, Inc., New York (1953), pp. 486–487.

LORRAINE A. WEINBERGER, *Primary Examiner.*

R. K. JACKSON, I. R. PELLMAN, *Assistant Examiners.*